(No Model.) 2 Sheets—Sheet 1.
A. JACQUOT.
HARNESS SADDLE.
No. 325,088. Patented Aug. 25, 1885.
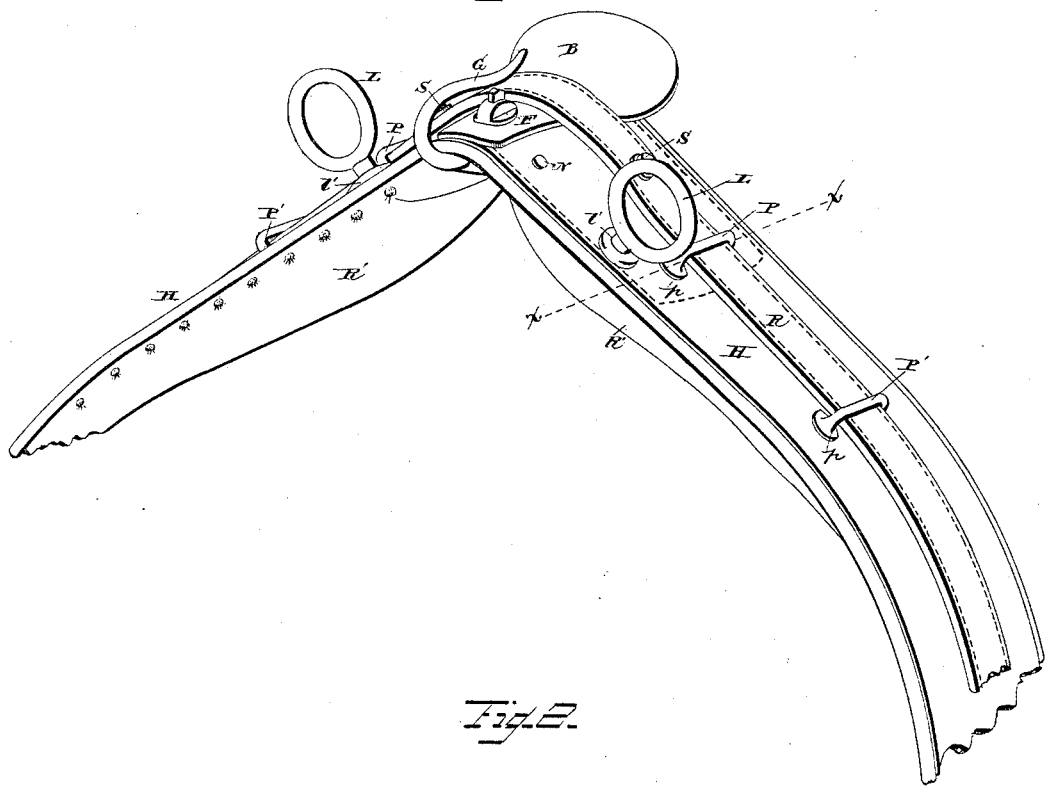
Fig. 1.
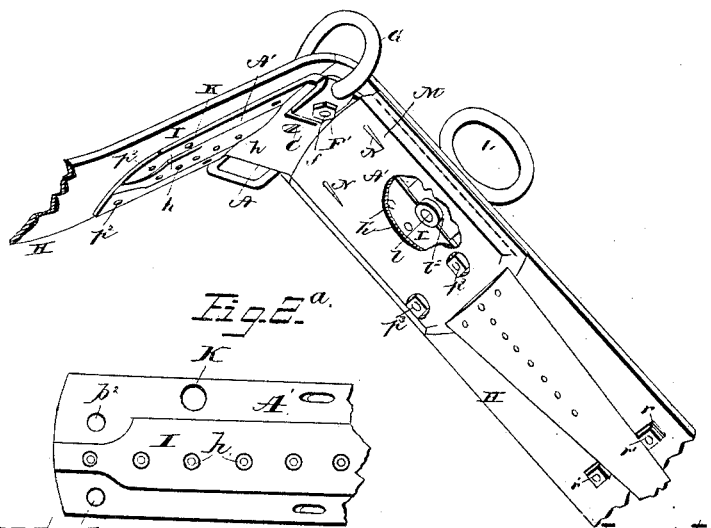
Fig. 2.
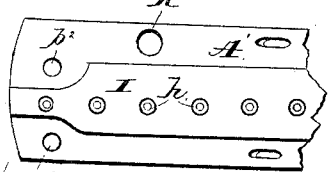
Fig. 2ª.
Witnesses
Chas. J. Williamson.
Henry C. Hazard.
Inventor
Albert Jacquot
by Prindle and Russell
attorneys (No Model.) 2 Sheets—Sheet 2.

A. JACQUOT.
HARNESS SADDLE.

No. 325,088. Patented Aug. 25, 1885.

Witnesses
Chas. J. Williamson
Henry C. Hazard

Inventor
Albert Jacquot
by Prindle and Russell
attorneys

UNITED STATES PATENT OFFICE.

ALBERT JACQUOT, OF WILMINGTON, DELAWARE.

HARNESS-SADDLE.

SPECIFICATION forming part of Letters Patent No. 325,088, dated August 25, 1885.

Application filed March 25, 1885. (No model.)

*To all whom it may concern:*

Be it known that I, ALBERT JACQUOT, of Wilmington, in the county of New Castle, and in the State of Delaware, have invented certain new and useful Improvements in Harness-Saddles; and I do hereby declare that the following is a full, clear, and exact description thereof, reference being had to the accompanying drawings, in which—

Figure 3:
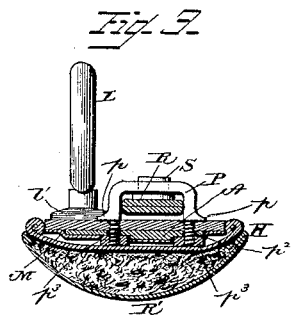
Figure 4:
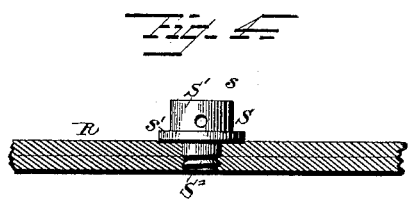
Figure 5:
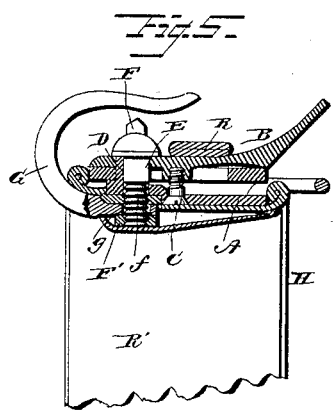

Figure 1 shows a perspective view of my improved harness-saddle; Fig. 2, a perspective view, from below, of the same, with the padding under covering and a portion of the skirts removed. Fig. 2$^a$ is an enlarged bottom plan view of one of the side plates of the tree; Fig. 3, a detail sectional view on line $x$ $x$ of Fig. 1; Fig 4, a detail view of one of the stops removed, and Fig. 5 a detail sectional view of the seat and tree.

Letters of like name and kind refer to like parts in each of the figures.

The object of my invention is to provide an improvement in harness-saddles, more especially adapted for use with sulkies and other two-wheeled vehicles, but also adapted for use with other styles of carriages in which shafts are used; and to this end my invention consists in the construction, arrangement, and combination of parts, as hereinafter specified.

In the drawings, A designates the saddle-tree, which is, as usual, made of malleable iron. The seat B is attached to and held in place on the tree by means of the screw C, passing up through the tree into the seat, and by the lug D, extending upward from the tree into and engaging the forward end of the opening E in the forward portion of the seat. The shank $f$ of the check-rein snap F is at its upper end, where it passes down through the opening E, squared and made to fit the portion of the opening not filled by the lug D. The lower end of this shank is screw-threaded, as shown. The check-rein hook G has its lower end bent around under the forward edge of the tree, and is provided with a hole, $g$, through which extends the lower end of the shank of the snap F. A nut, F', is screwed on this shank up against the hook-end.

By such construction not only are the hook and snap held firmly in place, but the seat is held more strongly and steadily upon the tree, as the lug D on the tree is held closely between the squared upper end of the snap-shank and the forward end of the opening E in the seat. The upper ends of the skirts H H, as usual, extend up between the seat and the tree, where they are fastened together. Upon the under face of each of the side plates, A' A', of the tree is formed the longitudinal flat rib I. In each of these side plates, A' A', of the tree, in the portion forward of the rib I, is a hole, K. Through the skirt and one of these openings passes the shank $l$ of one of the terrets L L. Each of these terret shanks is provided with a collar or flange, $l'$, bearing upon the top of the skirt, and upon its screw-threaded lower end has a screw-nut, $l^2$, bearing against the under side of the tree-plate. This nut is so formed as to have a substantially straight side adapted to engage the side of the rib I, so as to prevent and hold the nut from turning when the shank of the terret is screwed down upon it.

Through holes $h$ $h$ in the tree, nails or rivets $h'$ $h'$ are driven up into the skirts H H and headed or clinched. On the under side of each tree-plate A' there is a strip of leather, M, extending at its sides and end beyond the edges of the plate. These overlapping edges of the leather are sewed to the skirt. Nails N N are driven down through each skirt, near its upper end, through holes in the tree-plate and through the leather strip M, their ends being clinched, as shown in Fig. 2, underneath such strips. Upon the saddle, on each side, are two guide-loops, P and P', in line with each other. The shaft-strap R passes loosely through these and up over the saddle-seat. This strap is, as shown, not fastened to the saddle, as in the ordinary form of harness-saddle, but is free to slide or play longitudinally through the guides and over the seat B.

As shown, the line of the guides is such that the strap passes over the saddle in rear of the terrets. Each guide-loop is formed in the shape of a staple, having on each leg a flange or collar, $p$, adapted to rest upon the upper surface of the skirt. The lower ends of these legs are screw-threaded, and upon them are the screw-nuts $p^3$ $p^3$. The shanks of each of the upper guides, P P, (the one nearest the seat B,) pass down through the skirt and through holes $p^2$ $p^2$, provided therefor in the saddle-tree, and upon their lower ends the nuts $p^3$ $p^3$ are screwed up against the tree-plate. These guides serve, then, not only as guides for the free shaft-straps, but by their peculiar construction and manner of fastening they also aid in fastening and holding the skirts to the saddle-tree. The lower or outer guides, P' P', are formed like those already described. The ends of the shanks of each one pass down through the skirt and through openings in the flat bar or plate $r$ on the under side of the skirt. Nuts $r'$ $r'$ are screwed on these shanks up against such bar. On the under side of the tree, and of the skirts beyond the tree, is the usual form of padding, R', sewed or attached in any desired way. It has been found very advantageous to make the shaft or thill strap in one piece, as I have herein shown and described it. Where the strap-loops are attached to separate straps, and the upper ends of the latter are fastened to the saddle by riveting or otherwise, it is impossible to avoid making a weak place in the strap at the point of attachment. The making of rivet or nail holes through the strap-end weakens it very much, and stitching not only weakens it, but cannot be relied upon to hold. As where sulkies or other two-wheeled vehicles are used the life of the driver or occupant of the vehicle depends upon the thill or shaft straps and loops, it is obviously most desirable that the supports for the thills or shafts should be made in the strongest possible manner. A single continuous strap, such as mine, running freely through guides and over the seat so as to have longitudinal play, has no weak points, and is subjected to strain equally throughout its length. On account of its free play, one end of the strap cannot be subjected to more strain than the other, and the whole strap adjusts itself to the pressure or pull brought to bear upon it. To limit this play and prevent too great an amount thereof, I fix on the strap the stops S S. These stops, which are situated on the strap on each side between the seat and the upper guide, P, are so placed as to allow an inch or more of play in the strap in either direction before one of the stops strikes the guide. Each stop consists of the head S', of sufficient height to strike the cross-bar or top of the guide, and the screw-shank $S^2$, adapted to be screwed into the strap. The head is preferably provided with the radial hole or passage $s$, to facilitate the screwing home of the stop by a pin, small rod, or other tool inserted in the hole, and with a collar, $s'$, adapted to bear upon the top of the strap when the stop is screwed home. The collars or flanges on the shanks of the staple-shaped guides are on the inner sides of the shanks cut away so as not to interfere with the play of the strap.

Having thus described my invention, what I claim is—

1. In a harness-saddle, in combination with the seat provided near its front with an opening, the tree provided with a lug entering this opening, and with a hole below such opening, the check-snap having a shank passing down through and filling the portion of the opening in the seat not filled by the lug on the tree, and a screw passing up through the tree into the seat.

2. In combination with the seat provided with the rectangular opening near its front, the tree having an opening below and a flat lug extending up into the opening in the seat, a screw passing up through the tree into the seat, and the check-snap having a rectangular shank adapted to fit the portion of the seat-opening not filled with the tree-stud, substantially as and for the purpose described.

3. In a harness-saddle, the combination of the seat provided near its front end with a rectangular opening, the tree provided with an opening below and a flat lug extending up into the seat opening, the screw passing through the tree and into the seat, the check-rein hook having its lower end extending under the tree, the check-snap having its shank extending down through the openings in the seat and tree and through the hook-end, and a nut screwed on the lower end of such shank, adapted to be screwed up against the hook-end, substantially as and for the purpose described.

4. In combination with the terret having its shank extending down through the skirt and the plate of the tree, the screw-nut on the lower end of the shank and the rib on the tree-plate, adapted to engage the nut and prevent it from turning, substantially as and for the purpose described.

5. In a harness-saddle, the guide-loops on each side of the saddle, in combination with the shaft or thill supporting strap passing loosely through such loops and over the seat, and the two stops attached or fixed to the strap on each side of the seat, attached to the strap between the seat and the guide-loops, substantially as and for the purpose described.

6. In combination with the guides P P on the saddle, the thill or shaft strap passing through such guides and over the seat, and the two stops each consisting of a screw-shank screwed into the strap and a head adapted to come in contact with one of the guides, substantially as and for the purpose described.

In testimony that I claim the foregoing I have hereunto set my hand this 21st day of February, A. D. 1885.

ALBERT JACQUOT.

Witnesses:
THOMAS FERRY,
GEORGE O'NEILL.